(12) United States Patent
Galassi et al.

(10) Patent No.: US 6,286,661 B1
(45) Date of Patent: Sep. 11, 2001

(54) ADJUSTABLE PALLET METHODS AND APPARATUS

(75) Inventors: Rossano Galassi, Florence; Antonio Randazzo, Venice; Maurizio Mugelli, Siena, all of (IT)

(73) Assignee: Axis USA Inc., Tampa, FL (US)

( * ) Notice: Subject to any disclaimer, the term of this patent is extended or adjusted under 35 U.S.C. 154(b) by 0 days.

(21) Appl. No.: 09/586,182

(22) Filed: Jun. 1, 2000

Related U.S. Application Data

(62) Division of application No. 08/992,687, filed on Dec. 17, 1997, now Pat. No. 6,089,365.
(60) Provisional application No. 60/035,559, filed on Jan. 14, 1997, and provisional application No. 60/040,784, filed on Mar. 14, 1997.

(51) Int. Cl.⁷ .................................................. B65G 29/00
(52) U.S. Cl. .................. 198/803.11; 198/345.3; 198/465.1; 198/867.08
(58) Field of Search .................. 198/345.1, 345.3, 198/465.1–465.3, 867.01, 867.08, 867.11, 803.11, 803.14; 269/166–170, 140–142

(56) References Cited

U.S. PATENT DOCUMENTS

| | | | |
|---|---|---|---|
| 2,362,067 | 11/1944 | Heinrich | 269/169 |
| 2,968,850 | 1/1961 | Tinnerman | 24/81 |
| 3,334,931 | 8/1967 | Holt | 287/58 |
| 3,858,723 | 1/1975 | Weiss | 206/386 |
| 4,844,237 | * 7/1989 | Petersen | 198/465.1 |
| 5,060,780 | * 10/1991 | Santandrea et al. | 198/345.1 |
| 5,060,781 | * 10/1991 | Santandrea et al. | 198/345.1 |
| 5,094,131 | 3/1992 | Sorensen et al. | 269/169 |
| 5,099,978 | 3/1992 | Santandrea et al. | 198/345.1 |
| 5,115,901 | 5/1992 | Santandrea et al. | 198/345.3 |
| 5,255,778 | 10/1993 | Santandrea et al. | 198/803.11 |
| 5,265,542 | 11/1993 | Allard et al. | 108/138 |
| 5,346,058 | * 9/1994 | Santandrea et al. | 198/803.11 |
| 5,348,142 | 10/1994 | Nishimura et al. | 198/803.01 |
| 5,474,166 | * 12/1995 | Santandrea et al. | 198/345.1 |

FOREIGN PATENT DOCUMENTS

| | | | |
|---|---|---|---|
| 14 69151 | 4/1967 | (FR) | . |
| 141806 | 4/1920 | (GB) | 209/169 |

* cited by examiner

Primary Examiner—Christopher P. Ellis
Assistant Examiner—Mark A. Deuble
(74) Attorney, Agent, or Firm—Fish & Neave; Robert R. Jackson; Michael E. Shanahan

(57) ABSTRACT

A pallet for carrying dynamo-electric machine component workpieces of different dimensions is provided with first and second support members, at least one of which is movably mounted on the pallet so that the distance between the support members can be adjusted to accommodate a wide range of differently dimensioned workpieces. The pallet may include an aperture which allows a removal device to pass through and remove a workpiece from, or deposit a workpiece to the pallet. Each movable support member is releasably locked so that a user may unlock and adjust the support members to a desired position.

6 Claims, 5 Drawing Sheets

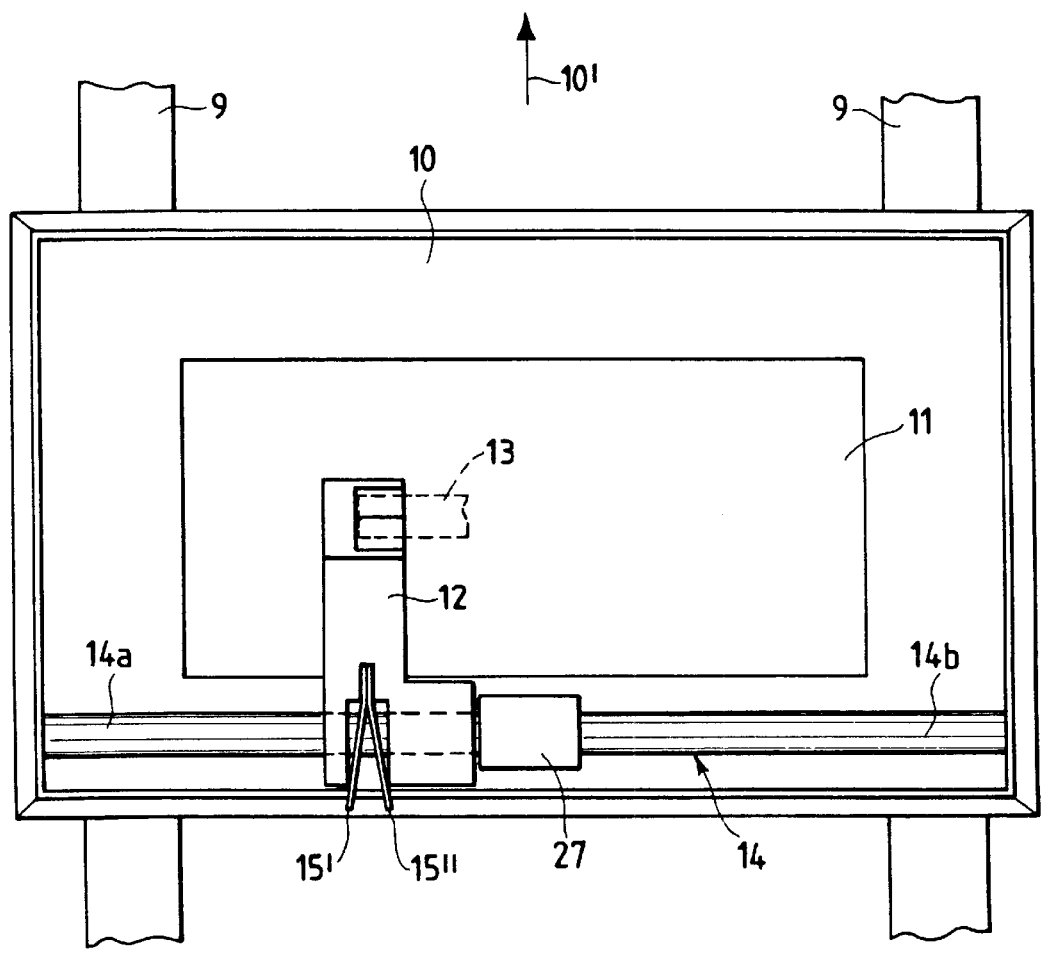

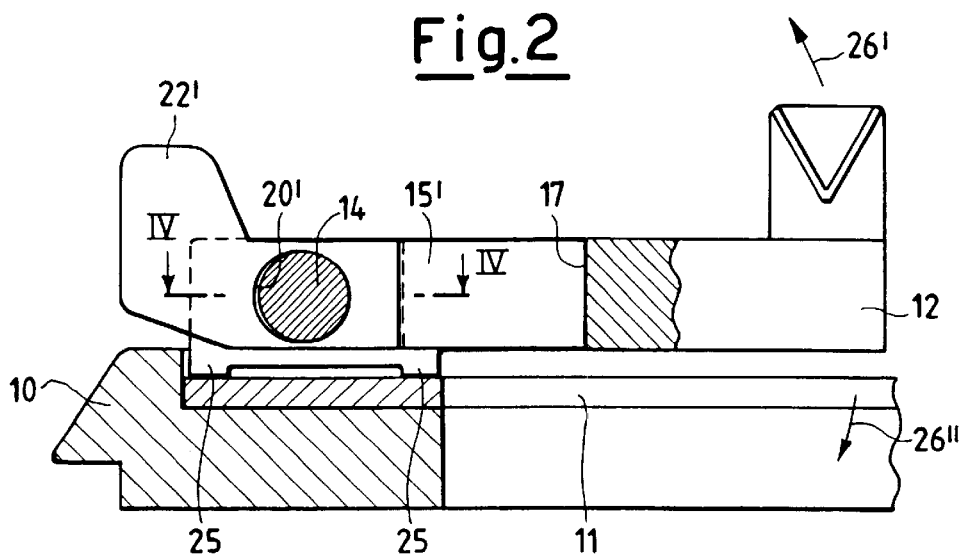
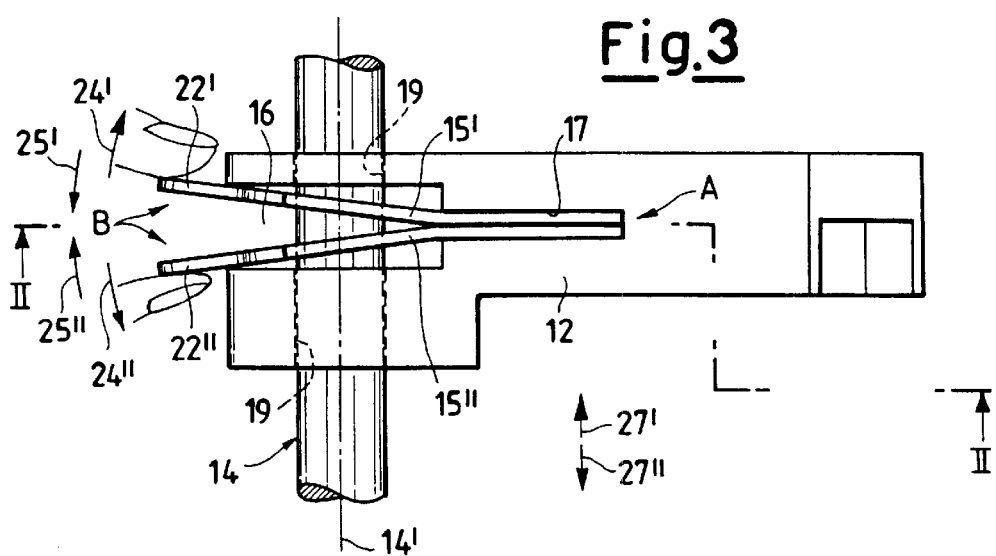
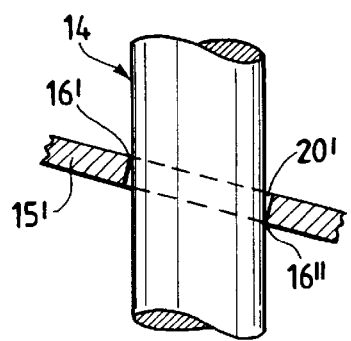

ADJUSTABLE PALLET METHODS AND APPARATUS

This application is divisional of U.S. patent application Ser. No. 08/992,687 filed Dec. 17, 1997 now U.S. Pat. No. 6,089,365 and claims the benefit of U.S. provisional applications No. 60/035,559, filed Jan. 14, 1997, and No. 60/040,784, filed Mar. 14, 1997.

BACKGROUND OF THE INVENTION

The present invention relates to improvements for adjustable pallets used in pallet conveyor production line systems for dynamo-electric machine components, and more particularly to apparatus and methods for adjusting the distance between support members of pallets capable of carrying dynamo-electric machine component workpieces of different dimensions.

The apparatus and methods disclosed herein are applicable to pallets having support members such as those shown in U.S. Pat. Nos. 5,060,780, 5,060,781, 5,099,978, 5,115,901, 5,255,778, 5,346,058 and 5,474,166, all assigned to the assignee of the present invention.

Pallet conveyor systems are used in production lines where dynamo-electric machine component workpieces (e.g., armatures or stators for electric motors, generators, alternators, etc.) are to be subjected to a sequence of operations at successive workstations. A workpiece that is to be assembled, machined, or operated on is placed on support members that are mounted on a pallet. The pallet is set upon a moving conveyor that will advance the pallet and the workpiece to a series of workstations that perform a sequence of desired operations to complete the production cycle. A plurality of pallets carrying a like plurality of workpieces are typically used.

The pallets may be frictionally driven by a conveyor. As a workpiece is brought to a workstation, the pallet is stopped and the work station operation is performed. While stopped, the pallet may continue to rest on the moving conveyor in sliding contact, or may be lifted off the moving conveyor. Depending on the desired operation, the workpiece may be worked upon while resting on the support members of the pallet, or it may be removed from the support members, worked upon, and then returned to the support members. At the conclusion of the operation, the pallet is released or placed back on the conveyor to advance to the next workstation. The pallets thus move asynchronously, i.e., pallets upstream of a stopped pallet will advance until they are stopped behind a stopped pallet while the conveyor continues to advance, individually or in sets or groups, and accumulate in order to wait their turn at the workstation.

Pallet conveyor production lines are adapted for performing the same operations on workpieces that belong to the same family of workpieces and require the same machining operations, even though they may differ in certain dimensions. It is known to provide workstations with automatic adjustment devices that can receive workpieces of different dimensions and adjust for the differences in order to properly perform the desired operation. Sometimes support members of pallets in conventional pallet conveyor systems are manually adjusted for the dimensions of particular workpieces for a particular production cycle.

One of the problems associated with adjusting support members of conventional pallets is the redundancy of effort involved in locking and unlocking the support members relative to the pallet. Support members having mechanical connecting links or fasteners are manually loosened in order to move the support members, and then manually re-fastened to secure the support members in a desired location. This re-fastening step is a substantial duplication of the effort expended to unlock the support member. Thus, it would be desirable to eliminate the duplicative manual re-fastening step.

Another problem associated with adjusting support members of conventional pallets is that manual adjustment procedures typically allow for error in the settings used from one pallet to the next. As a result, workpieces are not always properly supported during the production cycle, which may result in differences in the quality of the finished product.

SUMMARY OF THE INVENTION

It is therefore an object of the present invention to provide more efficient methods and apparatus for adjusting the positions of the dynamo-electric machine component workpiece support members of a pallet to correspond to the dimensions of particular workpieces.

It is another object of this invention to provide a pallet with a locking means having a manual release mechanism that can be easily unlocked to permit movement of the support members, and then automatically locked to secure support members in place.

It is yet another object of this invention to provide adjustment methods and apparatus for uniformly adjusting the locations of and/or distance between support members of the pallets so that dynamo-electric machine component workpieces having a given set of dimensions are properly supported on the pallet.

It is a further object of this invention to provide a pallet with a locking means that impedes accidental or unwanted unlocking of the release mechanism.

In accordance with this invention, apparatus and methods are provided for uniformly adjusting the locations of and/or distance between two dynamo-electric machine component workpiece support members of pallets to compensate for the different dimensions of the workpieces to be operated on by a given pallet conveyor production line. Broadly, the invention concerns a modified pallet and an adjustment apparatus that is constructed such that the support members can be manually adjusted to a desired position corresponding to the workpiece and, prior to and subsequent to engagement, the support members are locked in place on the pallet.

The adjustment apparatus of the present invention includes a means for engaging the first and second support members of the pallet such that once the support members are moved into the desired position further movement in the direction of adjustment is prevented.

The pallet of the present invention includes at least two support members that are slidably mounted relative to the pallet and to each other, and a preferably cylindrical guide bar for controlling the direction of movement of the first and second support members. The guide bar may have an inexpensive cylindrical shape and is preferably mounted on the pallet such that it is easy to replace when worn. The first and second support members may be independently laterally moved toward or away from each other along the guide bar within an extreme range of selectable positions to accommodate a range of workpiece dimensions appropriate for a given production line. The guide bar may also support the weight of the support members in the loaded or unloaded condition.

A locking means is provided so that each support member can be tightly secured on the guide bar with no movement relative to the pallet, for example, at times other than when the support members are to be adjusted. The locking means includes a manual release mechanism to unlock the support members so that they can be moved relative to the pallet into a desired position. The manual release mechanism is configured so that when the desired adjustment of the support member is obtained, simply disengaging contact with the release mechanism causes it to automatically lock the support member into place. In the preferred embodiment, each support member has a separate locking means.

Further with regard to the locking means, the guide bar preferably has a longitudinal axis and first and second surface portions that are each substantially parallel to the longitudinal axis and that face away from one another. Each workpiece support member is mounted on the pallet for movement substantially parallel to the longitudinal axis. The locking structure for a support member is mounted on that support member. The locking structure has first and second edges that respectively face toward the first and second surface portions and that are spaced from one another by a distance which is slightly greater than an adjacent perpendicular distance between the first and second surface portions. The locking structure is resiliently biased to rotate the first and second edges about a medial axis which is between them so that the first and second edges respectively contact the first and second surface portions and thereby cause the locking structure to resist motion of the support structure parallel to the longitudinal axis. The locking structure releases the support structure for movement parallel to the longitudinal axis when a user of the pallet rotates the first and second edges about the medial axis opposite to the resilient bias, thereby reducing contact between the first and second edges and the first and second surface portions.

The pallet of the present invention may also be equipped with a means for lifting the workpiece rapidly, to take it to a workstation for operation, and subsequently return the workpiece to the pallet. This arrangement may reduce the amount of time required to perform the operation at the workstation as compared to the time required for the workstation to perform the operation while the workpiece is held by the pallet.

In operation, adjustment of the support members in accordance with one embodiment of the invention is carried out as follows. Optional adjustment apparatus is placed at a convenient location, typically along the pallet conveyor of the production line, and preferably before the workpiece is initially placed on the pallet. The adjustment apparatus includes movable stops which have been set to reflect the desired locations of and spacing between support members for a given workpiece. A pallet is placed under the adjustment apparatus so that it can be raised to a higher position in order to be adjusted. An operator unlocks at least one workpiece support member from the guide bar on the pallet and moves the support member along the guide bar in the desired direction of adjustment to a desired position, which is against one of the stops on the adjustment apparatus. After the desired position is obtained, the user relocks the support member to the guide bar and returns the pallet to the pallet conveyor. Subsequent adjustments of the support members may be made during the remainder of the production cycle to accommodate changing needs of the workpiece. However, this is preferably done while the workpiece has been removed from the pallet and taken to a workstation.

In an alternate embodiment of the present invention, the operative elements of the locking structure of a support member are recessed so that they cannot be directly engaged by human hands. In embodiments such as this, contact with the locking structure can be made using a tool specifically designed to engage that structure or by inserting a commonly available tool such as pliers into the recess. Once the recessed locking structure is engaged, the support member may be unlocked and moved as described above. This feature improves the security of the pallet by preventing inadvertent or accidental unlocking and movement of the support members.

BRIEF DESCRIPTION OF THE DRAWINGS

The above and other objects and advantages of the invention will be apparent upon consideration of the following detailed description, taken in conjunction with the accompanying drawings, in which like reference numerals refer to like parts throughout, and in which:

FIG. 1 is a top view of an illustrative embodiment of the pallet and support member of the present invention.

FIG. 2 is a side view, partly in section, of the embodiment depicted in FIG. 1.

FIG. 3 is a top view of one embodiment of a support member of the pallet in FIG. 1, constructed in accordance with the principles of the present invention.

FIG. 4 is a detail view, partly in section, of a portion of FIG. 3.

DETAILED DESCRIPTION OF THE PREFERRED EMBODIMENTS

Figure 5:
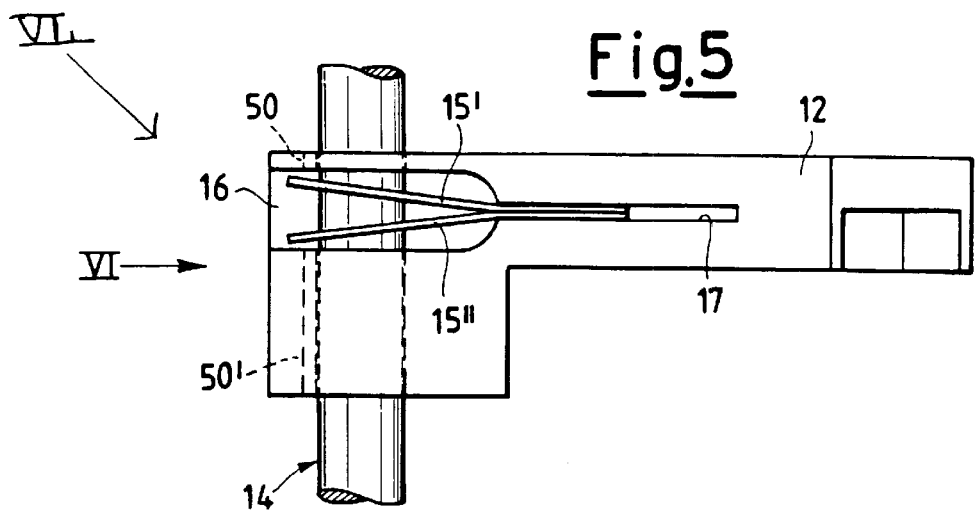
FIG. 5 is a top view of another embodiment of a support member of the pallet in FIG. 1, constructed in accordance with the principles of the present invention.

FIG. 1 shows a plan view of a pallet 10, according to the principles of this invention, traveling along a manufacturing line in direction 10' by resting on spaced apart moving conveyor belts 9. The pallet is provided with an aperture 11 over which are suspended support members (e.g., member 12) for supporting the end portions (e.g., end portion 13) of a dynamo-electric machine component workpiece. The aperture has the same function as that of the aperture belonging to the pallets presented in the patents cited above, which is to allow passage of a load/unload device for the workpiece. Only one support member 12 and workpiece end portion 13 are shown in FIG. 1, although another oppositely facing support member for supporting the other workpiece end portion will typically be present for correctly supporting the workpiece. The support members may be adjusted to support workpieces of different lengths by being positioned at different distances from each other along guide bar 14 fixed to the pallet. Up to this point in the description, the foregoing are principles similar to those which have been described in the patents cited above.

In the illustrative embodiment shown herein the workpieces are dynamo-electric machine armatures, each of which has a core and a shaft extending axially through the core. Each end of the shaft is supported by a respective one of two support members 12 on the pallet. In particular, element 13 in FIG. 1 represents one end of an armature shaft in a V-shaped seat in support member 12. (See also FIG. 2 for additional depiction of the V seat.) It will be noted that the depicted V seat terminates (on the left as viewed in FIG. 1) with an abutment surface which cooperates with a similar, but oppositely facing abutment surface on the other support member on the pallet to maintain an armature at a precise location on the pallet. In order for these abutment surfaces to perform this important function satisfactorily, support members 12 must not shift on the pallet, even when the ends of the armature shaft contact the abutment surfaces. Such contact may be produced by inertia or other forces acting on the armature as it travels along the production line. As will be seen from what follows, the support member locking structures of this invention enable support members 12 to resist shifting due to forces acting on an armature on the pallet. While the invention is thus particularly suited to use on pallets for armatures, the invention can also be used on pallets for other dynamo-electric machine components such as stators.

FIGS. 2, 3 and 4 illustrate the principles of the present invention for guiding, releasing and locking the support members to the pallet that are required to adjust the supports members when workpieces of different lengths are presented.

In FIG. 3 (which is a magnified fragmentary view of the support member shown in FIG. 1) support member 12 of the pallet is provided with two plate arms 15' and 15" that are seated within recess 16. The two plate arms are oppositely bent in an outward direction along their length starting from end A out to end B. The plate arms 15' and 15" are fixed to the support member 12 by inserting end A into slit 17 with a close fit. When attaching the plate arms to the support member by inserting their ends A into slit 17, the original outward bend of the plate arms in direction 24' and 24" (respectively for plate arms 15' and 15") is reduced to cause the plate arms to be elastically preloaded when finally assembled. Consequently, in the finally assembled condition, plate arm 15' will be biased outwardly in direction 24', and plate arm 15" will be biased in direction 24". In FIG. 2 (which is a view taken along the line 2—2 of FIG. 3) plate arm 15' is shown in an elevated representation having bore 20' with a bore central axis essentially perpendicular to a plane containing plate arm 15'. Although not shown, plate arm 15" has an identical associated bore 20". The diameters of the bores are slightly larger than the diameter of the guide bar. Guide bar 14 passes through both the bores 20' and 20", and is concentric around the bore central axis. The guide bar is also received in bores 19 of the support members 12 and 12' for a reason which will be more fully described in the following. Plate arms 15' and 15" are also provided with respective upward extensions 22' and 22" at end B to allow an easier engagement for reasons which will be more fully described in the following.

In the assembled condition, when the plate arms are biased outwardly as described above, the bores 20' and 20" will be oblique with respect to axis 14' of the guide bar and in contact at 16' and 16" with the guide bar (i.e., portions of the sides of the bores will be in direct contact with the guide bar). This condition is obtained with the plate arms in the positions shown in FIGS. 2 and 3. The contact at 16' and 16" for plate arm 15' is shown in FIG. 4 (partial section view from 4—4 of FIG. 2). The force of this contact will be proportional to the elastic preload of the plate arms, causing a friction reaction between the plate arms and the guide bar at 16' and 16", thus securing the support to the guide bar. Any tendency of the support members to move along the guide bar 14 when they are secured increases the elastic deformation of the plate arms, which in turn increases the force of the securing friction reaction at 16' and 16".

Human fingers can easily engage upward extensions 22' and 22" to squeeze the plate arms towards each other in directions 25' and 25". This will reduce the bias on the plate arms and bring bores 20' and 20" to be less oblique with respect to the guide bar, thus reducing the contact force at 16' and 16". The reduction of the contact force causes the support members to become "unlocked," i.e., movable along the guide bar 14, so that they may be pushed by a human in directions 27' or 27" of FIG. 3 for adjustment. During this movement, the support members will be guided in bores 19 by guide bar 14 and also by feet 25, which are in contact with the pallet. The inside of bores 19 that contact with guide bar 14 and feet 25 react to oppose any tendency of the support members to topple in directions 26' and 26" contained in the plane of FIG. 2.

The guide bar 14 is secured to the pallet by clamping it in support block 27. Support member 12 runs on portion 14a of guide bar 14, while the other oppositely facing support member runs on portion 14b of guide bar 14 during adjustment. The single, centrally located support block 27 for guide bar 14 leaves clear a considerably long adjustment distance for the support members along guide bar 14.

Figure 6:
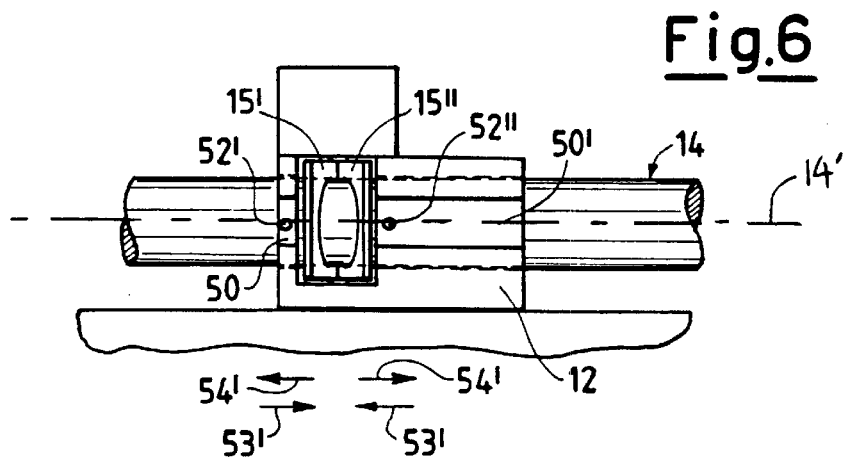
FIG. 6 is a side view taken along the line 6—6 in FIG. 5.
Figure 7:
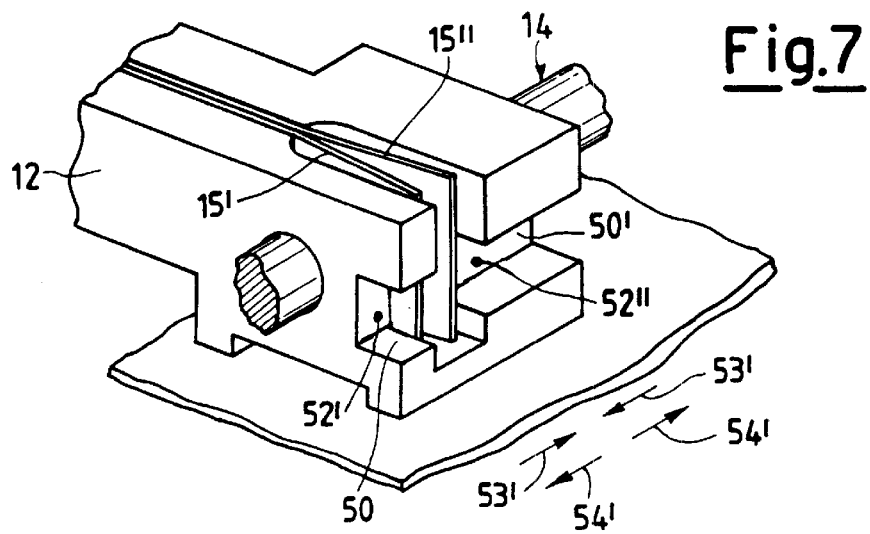
FIG. 7 is a perspective view taken in the direction of arrow 7 in FIG. 5.

Another embodiment in accordance with the principles of the present invention is shown in FIGS. 5–7. This embodiment contains modified components and features which improve the security of the previous embodiment. Specifically, FIG. 5 shows that plate arms 15' and 15" no longer have the upward extensions 22' and 22" as shown in FIGS. 1–3. Rather, plate arms 15' and 15" are configured to be completely enclosed within recess 16 of support member 12. FIG. 6 shows that support member 12 is provided with rectangular horizontal recesses 50 and 50' which are positioned parallel to axis 14' at approximately half the vertical height of plate arms 15' and 15". The configuration of recesses 50 and 50' can be better seen in FIG. 7 which is a perspective view from arrow 7 shown in FIG. 5. As shown in FIG. 7, portions of plate arms 15' and 15" protrude from support member 12 between recesses 50 and 50'. By inserting a tool (such as pliers) into recesses 50 and 50' at locations 52' and 52" the protruding portions of plate arms 15' and 15" may be engaged and moved toward each other in direction 53', causing plate arms 15' and 15" to also move toward each other. If enough force is applied, plate arms 15' and 15" will be released from contact with guide bar 14, causing support arm 12 to be unlocked and therefore movable along guide bar 14. The unlocked support member may then be pushed along guide bar 14 in order to adjust the pallet. However, support member 12 must be kept in the unlocked state by applying sufficient force in direction 53' when pushing it along guide bar 14.

Returning to FIG. 6, it will be noted that recesses 50 and 50' communicate with recess 16 (shown in FIG. 5) of support member 12 to the extent that a tool may come in contact with plate arms 15' and 15". In FIG. 7, the end portions of the plate arms 15' and 15" have been broken away to show more clearly how this communication is configured. When the support member 12 is in the unlocked state and has been moved to the desired adjustment position, the tool responsible for unlocking support member 12 is disengaged from contact with plate arms 15' and 15". The preload force on plate arms 15' and 15" causes them to move in direction 54' until the friction of contact with guide bar 14 stops this movement, effectively locking support arm 12 in a particular position on pallet 10. Recesses 50, 50' and 16 are dimensioned such that human fingers cannot be inserted within them to squeeze plate arms 15' and 15" in order to unlock support arm 12.

By recessing plate arms of the present invention, the likelihood of manual or accidental unlocking and moving of the support member during the production cycle is greatly decreased. As a result, the probability that the workpiece will be properly supported throughout the production increases, thus improving the efficiency and security of the production line.

Figure 8:
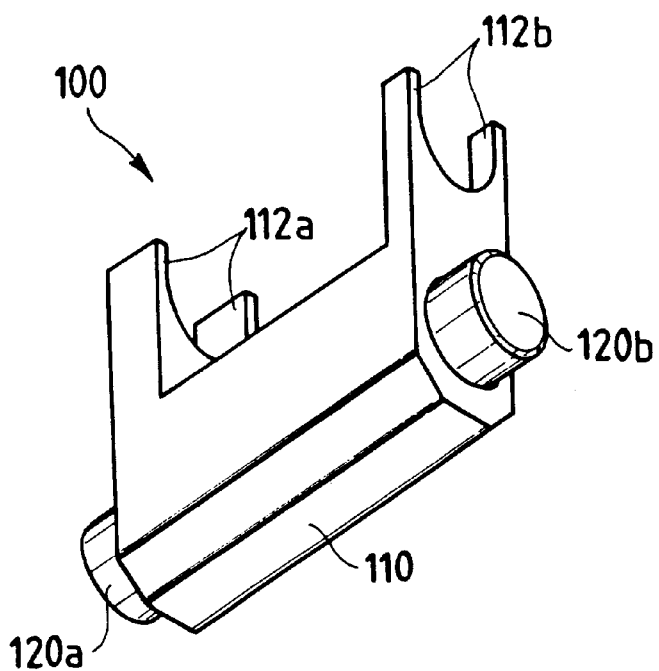
FIG. 8 is a simplified perspective view of an illustrative embodiment of a tool in accordance with the invention that can be used for facilitating operation of locking means of this invention.
Figure 9:
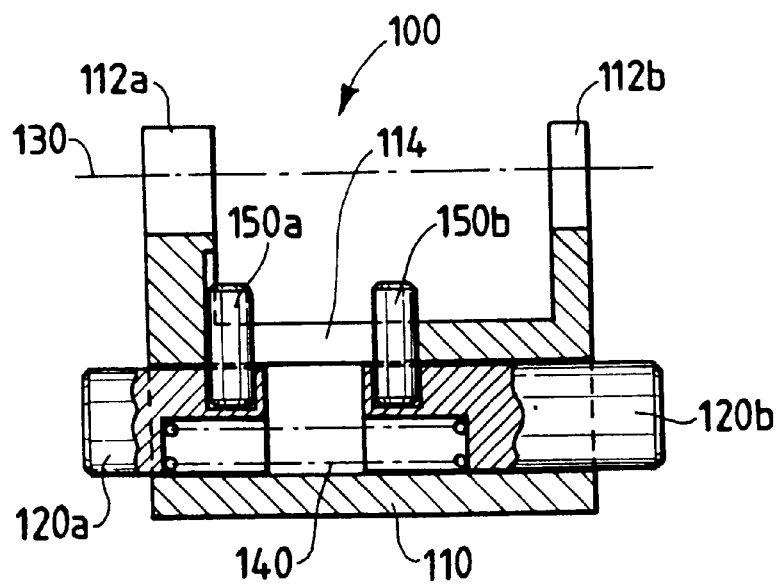
FIG. 9 is a sectional view of the tool shown in FIG. 8.

An illustrative embodiment of a tool 100 that is particularly adapted for use in adjusting the position of a support member 12 in embodiments of the type shown in FIGS. 5–7 is shown in FIGS. 8 and 9. Tool 100 includes a main body 110 having two laterally extending, semi-cylindrical, recess-defining yoke portions 112a and 112b. The semi-cylindrical recesses defined by yoke portions 112a and 112b are sized and spaced to fit easily and removably around guide bar 14 on respective opposite sides of support member 12. Two slidable bars 120a and 120b are disposed opposite end portions of a bore which extends through main body 110 parallel to the longitudinal axis 130 along which guide bar 14 can be received in the recesses in yoke portions 112. Bars 120 are resiliently biased apart by a prestressed compression coil spring 140 which is disposed between them. Each bar 120 has a pin 150a or 150b extending laterally from the bar out of a slot 114 in the side of main body 110 which faces toward yoke portions 112. The side walls of pins 150 contact the ends of slot 114 to limit the distance that bars 120 can move apart under the influence of spring 140.

When the semi-cylindrical recesses in the yoke portions 112 of tool 100 are pressed against guide bar 14 on respective opposite sides of a support member 12 of the type shown in FIGS. 5–7, the portions of pins 150 that project from slot 114 extend into recess 50/50' on respective opposite sides of plate arms 15'/15". Bars 120 can then be manually squeezed toward one another between the thumb and fingers of a hand holding tool 100. This causes pins 150 to squeeze plate arms 15'/15" together between the pins, thereby unlocking support member 12 from guide bar 14. With bars 120 still squeezed together with one hand, and with semi-cylindrical recesses still pressed against guide bar 14, tool 100 can be slid in either direction along the guide bar, and unlocked support member 12 will slide along the guide bar with the tool. When support member 12 reaches the desired new location along guide bar 14, bars 120 are released. This releases plate arms 15'/15", thereby locking support member 12 in its new location. Tool 100 can then be pulled away from guide bar 14 and support member 12.

From the foregoing it will be seen that tool 100 facilitates one-handed unlocking and shifting of a support member 12. If desired, two tools 100, one in each of an operator's two hands, can be used to help the operator simultaneously unlock and reposition both support members 12 on a pallet. Note that the spacing between yoke portions 112 is just slightly greater than the width of the portion of a support member 12 received between those yoke portions. In addition, bars 120 and pins 150 are positioned and configured so that when both bars are pushed in by approximately the same amount, plate arms 15'/15" are deflected toward one another by about the same amount. Thus tool 100 helps to hold plate arms 15'/15" in a neutral unlocked position as tool 100 is slid along guide bar 14 to adjust the location of support member 12.

Figure 10:
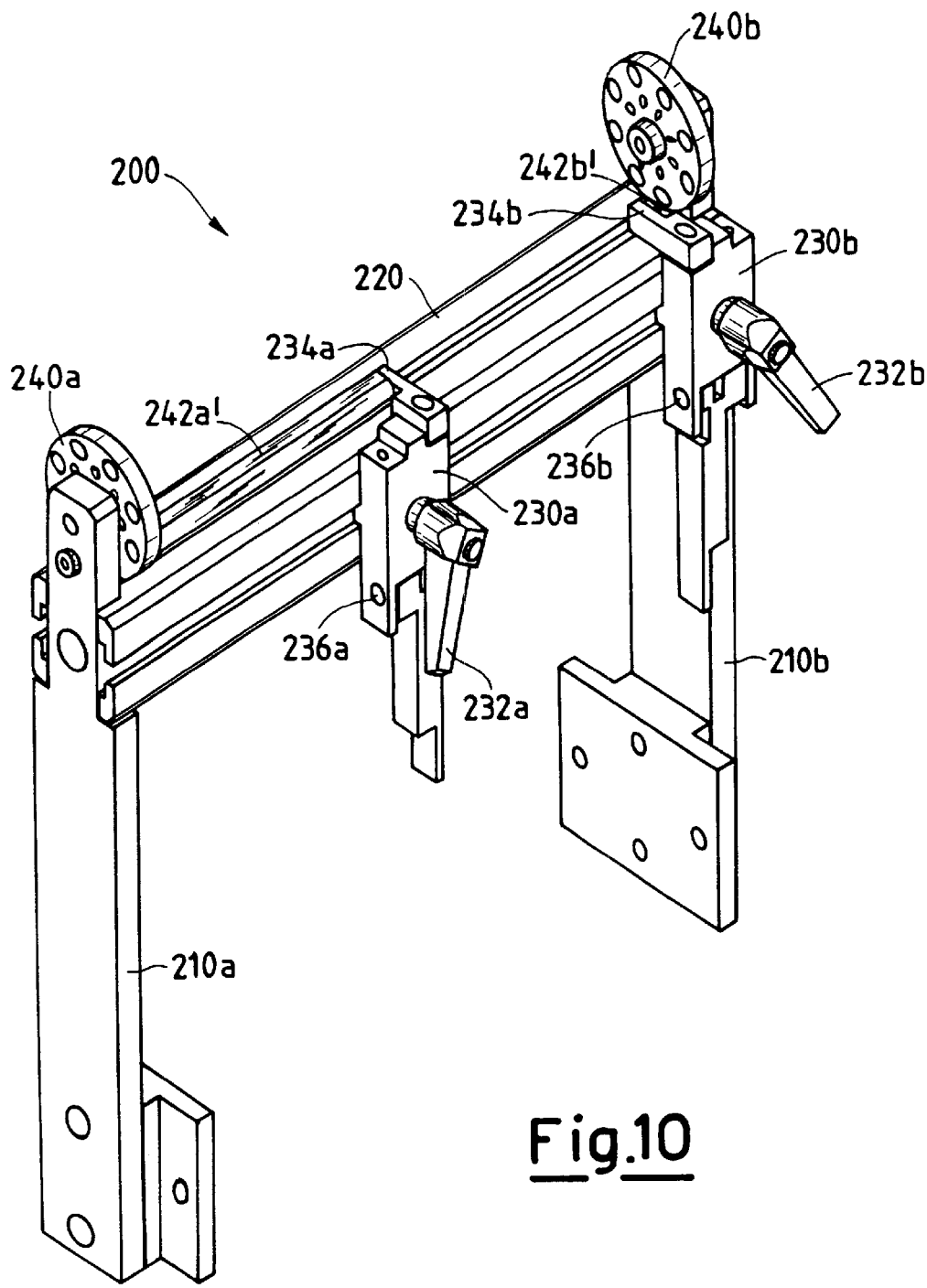
FIG. 10 is a simplified perspective view of an illustrative embodiment of apparatus in accordance with the invention for facilitating adjustment of pallets in accordance with the invention.

An illustrative embodiment of apparatus 200 in accordance with the invention for facilitating precise and repeatable adjustments of the positions of support members on pallets is shown in FIG. 10. Apparatus 200 includes two parallel, spaced support members 210a and 210b connected at their upper ends by a horizontal beam structure 220. Apparatus 200 is designed to be mounted relative to a pallet conveyor system so that beam structure 220 extends transversely across the conveyor system above pallets being conveyed along the system. The guide bar 14 of each pallet passing under beam structure 220 is substantially parallel to the longitudinal axis of that beam structure.

Beam structure 220 supports two stop structures 230a and 230b. Each stop structure 230 is movable along the longitudinal axis of beam structure 220 and releasably lockable in any desired position along the beam structure by appropriate rotation of the associated handle 232a or 232b. A rotatable turret 240a or 240b is mounted on an extreme upper portion of each support member 210. A plurality of abutment bars 242a1–n or 242b1–n (only one representative bar 242a1 or 242b1 being shown for each turret 240) extends from each turret toward the center of beam structure 220. The bars 242 on each turret 240 are substantially parallel to one another and spaced from one another in the circumferential direction around that turret. Different length bars 242 may be provided on each turret 240, and the bars are preferably removably mounted on the associated turret by being threaded into the turret. A portion 234a or 234b of each stop structure 230 can be brought into contact with the end of any bar 242 on the adjacent turret by rotating the turret to properly position the bar and then sliding the stop structure along beam structure 220 until the stop structure portion 234 contacts the end of the bar 242.

To set apparatus 200 up to adjust pallets for a new workpiece size, turrets 240 are rotated until bars 242 associated with that workpiece size are positioned to engage stop structures 230. Stop structures 230 are then slid along beam structure 220 until they contact the ends of the operative bars 242. Handles 232 are then rotated to lock stop structures 230 in place.

When a pallet to be adjusted reaches apparatus 200, the pallet is raised up off the pallet conveyor until the support members 12 on the pallet are at least partly intercepted by a horizontal axis that also intercepts lower portions of stop structures 230. Each support member 12 is then slid along the guide bar 14 of the pallet (e.g., using a manually operable tool or tools of the type shown in FIGS. 8 and 9) until a predetermined portion of the support member 12 comes in contact with a predetermined portion of an associated one of stop structures 230. The locking structure 15'/15" of each support member 12 is then released to lock the support member in place, and the pallet is lowered back down onto the pallet conveyor.

It will be appreciated that use of pallet adjustment apparatus of the type shown in FIG. 10 facilitates rapid and precise adjustment of pallets, even though the adjustments are actually made manually.

In the especially preferred embodiment shown in FIG. 10 the lower portion of each of stop structures 230 is pivotable about a pivot axis 236a or 236b which is substantially parallel to the longitudinal axis of beam structure 220. This allows the lower portions of structures 230 to pivot up out of the way of pallets traveling beneath beam structure 220 when apparatus 200 is not in use for facilitating pallet adjustments. In this way the overall height of apparatus 200 can be somewhat reduced if desired.

Although the locking structures 15'/15" of this invention are especially suitable for manual or manual tool operation, they can alternatively be operated by automatic machinery if desired. For example, automatically operable pincers may be automatically extended and then closed to release a locking structure 15'/15" on a pallet to be adjusted. Then the pincers may be automatically shifted laterally to shift the support member 12 associated with the locking structure 15'/15". When the support member is at the desired new position, the pincers may be automatically reopened to release and thereby lock locking structure 15'/15". Finally, the pincers are automatically retracted from the pallet that has been adjusted. To facilitate access to automatically operable locking structures 15'/15", it may be preferable to provide those structures with a different orientation than is shown in FIGS. 1–7. For example, if the automatically operable pincers are mounted over the pallet conveyor on an assembly somewhat like the structure shown in FIG. 10, then it may be desirable to rotate locking members 15'/15" 90° about a horizontal axis so that access to them is from above (e.g., by pincers lowered from an overhead beam structure somewhat like beam structure 220 in FIG. 10).

One skilled in the art will appreciate that the present invention can be practiced by other than the described embodiments, which are presented for the purposes of illustration and not limitation. The present invention is to be limited only by the claims which follow.

The invention claimed is:

1. A method of adjusting the location of a dynamo-electric machine component workpiece support member on a pallet comprising:

provided a stop structure having a stop member whose location relative to a remainder of the stop structure is movable and releasably lockable;

moving the stop member to a predetermined location relative to the remainder of the stop structure and locking the stop member in the predetermined location, the predetermined location having a predetermined relationship to a desired new location of the workpiece support member on the pallet;

positioning a pallet relative to the stop structure so that the workpiece support member is contactable by the stop member when the location of the workpiece support member is adjusted; and moving the workpiece support member relative to the pallet until the workpiece support member is stopped by contact with the stop member.

2. The method defined in claim 1 wherein the workpiece support member is releasably lockable relative to the pallet, and wherein the moving the workpiece support member relative to the pallet is preceded by:

unlocking the workpiece support member relative to the pallet.

3. The method defined in claim 2 wherein the moving the workpiece support member relative to the pallet is followed by:

locking the workpiece support member relative to the pallet.

4. The method defined in claim 1 wherein the moving the workpiece support member is performed substantially manually.

5. The method defined in claim 1 wherein the pallet is conveyed substantially horizontally on a pallet conveyor, wherein the stop structure is disposed above the pallet conveyor, and wherein the positioning comprises:

raising the pallet up off the pallet conveyor.

6. The method defined in claim 1 wherein the stop structure includes a plurality of abutment members, any one of which is positionable for contact by the stop member to establish a location of the stop member relative to the remainder of the stop structure determined by that abutment member, and wherein the moving the stop member is preceded by:

positioning a predetermined one of the abutment members for contact by the stop member.

* * * * *